(12) United States Patent
Aasted

(10) Patent No.: US 6,508,642 B1
(45) Date of Patent: Jan. 21, 2003

(54) APPARATUS FOR THE PRODUCTION OF SHELLS OF FAT-CONTAINING, CHOCOLATE MASSES

(75) Inventor: Lars Aasted, Charlottenlund (DK)

(73) Assignee: Aasted-Mikroverk APS (DK)

( * ) Notice: Subject to any disclaimer, the term of this patent is extended or adjusted under 35 U.S.C. 154(b) by 0 days.

(21) Appl. No.: 09/430,816

(22) Filed: Oct. 29, 1999

(30) Foreign Application Priority Data

| Nov. 2, 1998 | (EP) | 98203693 |
| Nov. 9, 1998 | (EP) | 98203783 |
| Feb. 19, 1999 | (EP) | 99200463 |
| May 5, 1999 | (EP) | 99201393 |
| Jun. 9, 1999 | (EP) | 99201823 |

(51) Int. Cl.⁷ .............................. A23G 1/20; A23G 1/21
(52) U.S. Cl. .................... 425/410; 425/414; 425/416
(58) Field of Search ................ 425/398, 410, 425/414, 416; 426/512

(56) References Cited

U.S. PATENT DOCUMENTS

| 1,472,229 A | | 10/1923 | Plempel | 425/218 |
| 3,291,873 A | * | 12/1966 | Eakin | 264/54 |
| 4,128,375 A | * | 12/1978 | Schubart | 425/405.2 |
| 4,402,659 A | * | 9/1983 | Greenbaum | 425/233 |
| 4,690,666 A | * | 9/1987 | Alexander et al. | 493/152 |
| 5,693,164 A | * | 12/1997 | Chang | 156/152 |

FOREIGN PATENT DOCUMENTS

| DE | 122020 | 2/1900 |
| DE | 197 20 844 C1 | 8/1998 |
| EP | 0 589 820 A1 | 3/1994 |
| EP | 0 589 820 B1 | 3/1994 |
| WO | WO 95/32633 | 12/1995 |
| WO | WO 97/49296 | 12/1997 |

* cited by examiner

Primary Examiner—Jan H. Silbaugh
Assistant Examiner—Donald Heckenberg
(74) Attorney, Agent, or Firm—Fish & Richardson P.C.

(57) ABSTRACT

A system for the producing of shells of fat-containing, chocolate-like masses, which includes more than one cavity to receive the masses and more than one core member to be immersed in the mass-containing cavity. The core members are independently suspended from a holding device. Further, a mold cavity closure extends peripherally around the core members, and the closure includes shell rim molding surfaces which cooperate with the outer surfaces of the cores and the inner surfaces of the mold cavities to determine completely the geometry of the molded shells in the closed position. The closure is axially movable relative to the core members.

7 Claims, 4 Drawing Sheets

APPARATUS FOR THE PRODUCTION OF SHELLS OF FAT-CONTAINING, CHOCOLATE MASSES

The present invention concerns a system for the production of fat-containing, chocolate-like masses, in particular for chocolate articles, by which an amount of liquid mass is deposited into more than one mould cavity, whereafter more than one core member is immersed into the mass forming the shells.

Systems for moulding of shells of fat-containing, chocolate-like masses through immersion of a core member into the liquid mass of an associated cavity and thereby bringing the mass into the desired shape are today well-known within the prior art, and are being used extensively by the chocolate making industry.

EP 0 589 820 A1 (AASTED-MIKROVERK APS) describes the first commercially available method and associated apparatus of the displacing type for industrial use. It relates to a method, where the chocolate-like mass under crystallisation solidifies to form the shell, the temperature of the mould cavity being lower than the temperature of the tempered mass, that a cooling member having a temperature lower than 0° C. is immersed into the mass and kept in the mass in a fully immersed position for a predetermined period of time. The cooling member is furthermore immersed immediately into the mass after this has been filled into the mould cavity and shaken out. The associated apparatus furthermore comprises means of controlling the up- and down movement of the cooling members, as well as controlling residence times in the fully immersed position. However, by this early teaching within the technical field of the present invention the chocolate-mass is filled into the mould cavity in an amount, which is typically about 10% larger than the volume of the finished chocolate-shell.

Generally within the present field, chocolate-like masses are suspensions of non-fat particles, such as sugar, milk powders and cocoa solids in a liquid fat phase. The fat phase in most cases comprises an extent of the genuine cocoa butter of until around 30%, but may comprise substitutes as well. Such substitutes may be in the form of other types of fat-containing oils. Chocolate-like masses where the cocoa butter has been replaced wholly or partly by other fats, are often named commercially as compound chocolate, in which the cocoa butter has been replaced by palm-kernel oil, or corresponding oils. Shells made of 100% fat being cocobutter or compound is also possible.

In the subsequent treatment of the ready-finished shell, the shell is frequently provided with a centre mass of a creamy or liquid food material, which differs from that of the shell. Thereafter the shell is closed either with other shell parts along the periphery of the shell or by means of a coating or flat bottom. For this purpose, it is very important that the periphery of the shell is complete or it will not be possible to make a tight joint.

Furthermore it is possible to join a produced shell with other types of shells immediately after being moulded, so that the finished food article being present as a hollow body e.g. in the form of eggs or figures, such as pixies and the like. In joining shells to produce hollow articles, it is of great importance that especially the rim of the shells is complete.

Furthermore, it should be mentioned that manufactured shells do not have to consist of just one layer of material but may e.g. consist of several layers of chocolate-like material. For example, one shell or part of made of dark chocolate may be provided with a further interior coating of white chocolate (or vice versa or any colour) by the same method and system even before the shell moulded first leaves the mould cavity.

The chocolate-like masses are deposited and shaken into the mould cavity in a tempered liquid state. For several decades, the technique of providing tempered chocolate-like masses has been well known to the persons skilled within the art of chocolate making. Chocolate-like mass being heated to 40–50° C. enters the process of tempering in which the mass in cooled down to around 27–32° C., whereby crystallisation is initiated. Thereafter, the chocolate-like mass is re-heated, normally not more than 2° C. providing the ready-tempered chocolate-like mass with a content of stable β crystals in an amount lesser than 5%. Thereby lower melting crystals are re-melted, so that only stable crystals remain in the ready-tempered mass. Such a process is for example performed by the AMK-tempering machines provided by Aasted-Mikroverk ApS, Denmark.

The quality of the ready-moulded chocolate shells has always been determined firstly by the state of the tempered chocolate mass. The skilled person knew that good flavour and mouth feeling chocolate, high gloss, high resistance to fat bloom as well as enhanced resistance to warm or heat was the consequence of the optimum tempering state, in which the liquid chocolate comprises only stable β crystals, especially small crystals before being deposited into the mould. However, before the invention of EP 0 589 820 B1 (AASTED-MIKROVERK APS), the skilled person thought that the setting of the deposited chocolate in the mould should be gentle and time consuming to an extent of often ½–1 hour before the moulded shell could be released from the mould cavity. By the invention of EP 0 589 820 B1 this prejudice was turned upside down, thereby discovering a method by which the deposited tempered chocolate was set rapidly e.g. typically within 10 seconds providing tremendous fast production rates for chocolate making industry.

DE 197 20 844 C1 (KMB PRODUCTIONS AG) discloses a system for moulding of shells primarily for moulding of chocolate shells. This system comprises multiple core members firmly fixed to a holding device. However, since the core members are firmly fixed it is not possible to lower the individual core members to different depths to compensate for inaccuracies in the dosage of chocolate or for differences in the depth of the individual mould cavities. The core members will simply all be lowered to the same pre-determined depth.

EP 0 715 813 (GEBR. BINDLER) discloses a similar system for moulding of chocolate articles, especially for chocolate shells, through displacement of the chocolate mass in a mould by immersion of a core member. The disclosed embodiments all have a multiplicity of core members firmly fixed to the same holding device. As in the above DE disclosure, the system has no way of compensating for inaccuracies in the dosage of chocolate or for differences in the depth of the individual mould cavities. Thus, if for some reason, one of the mould cavities of a mould element is clogged and the associated core cannot be immersed further than the depth of the obstruction, all the fixed cores will be halted and consequently all the shells of that mould element will be incomplete.

In practise, it has proven impossible to manufacture mould elements where all the mould cavities have exactly the same size, volume and especially depth. Furthermore, it is not possible due to mass viscosity changes to achieve exact dosage of the chocolate when it is deposited into the mould cavities. Consequently, when multiple core members are firmly fixed to the same holding device are lowered into the mould cavities the resulting displacement of chocolate will give rise to shells of different size. In order to ensure that all articles moulded were complete, it was necessary to compensate for these variations by over-dosing the deposited amount of chocolate, thus leaving a variable rim of surplus chocolate above the surface of the mould element.

WO 95/32633 (AASTED-MIKROVERK APS) describes a method and a system of the displacing type, by which an engagement ring is mounted peripherally around the cooling member by a press-fit or by threaded engagement. The engagement ring comprises at least one peripherally extending recess defining the moulded shell rim to compensate for inaccuracies in the deposited amount of chocolate. However, this teaching does not disclose anything about how more than one core member may be arranged to compensate for the above-mentioned inaccuracies.

For large and complex figures such as chocolate bars, Santa Clauses, Easter Bunnies et cetera one cannot be sure that the geometry of the figures are complete by this prior art, since the chocolate may not always rise to the surface of the cavity when the core member is completely immersed. The recess in part of the periphery, e.g. the part closest to the centre of the article, may simply take up too much of the surplus chocolate. Furthermore, since the core members are all fixed to the same holding device, it is not possible to lower them to different positions to achieve complete filling of all the shell volumes. In a large mould element, which may comprise multiple cavities, some articles will be complete, some incomplete and in some cases chocolate mass will be forced out through the closure means to contaminate this. One particular, important use of chocolate shells is for the manufacture of pralines. Shells for pralines are provided with a filling material and a bottom consisting of fat-containing chocolate-like masses is moulded while the shell is still in the mould element. The bottom is manufactured by depositing liquid tempered chocolate mass on top of the filling material, whereafter excessive chocolate mass is scarped off while still liquid. For this purpose it is important that essentially no part of the shell extends above the surface of the mould element, since in this case the scraper would tear the shells apart.

The present invention comprises a system for the production of shells of fat-containing, chocolate-like masses, in particular for chocolate articles, comprising more than one mould cavity to receive the mass, more than one associated core member to be immersed into the mass, the core members being independently suspended from a holding device. By independent is meant that the suspension of one core member cannot affect the suspension of the other cores. Similarly, the suspension of one single core is not affected by the suspension of the other cores.

Finally, the system comprises mould cavity closure means extending peripherally around or on the core members and shell rim moulding surfaces, which together with outer surfaces of the cores and inner surfaces of the mould cavities determine the full geometry of the moulded shells in closed position. Thereby, complete articles with a well-defined edge can be manufactured.

The cavity closure means are axially movable in relation to the core member. Thereby, the core members can be lowered into the mass after the cavity closure means have been moved unto closure engagement with the cavity. The closed nature of the cavity results in the creation of pressure in the direction of the core members, as the cavities are completely filled with chocolate. This improves the regulation of the vertical travel of the cores provided by the independent suspension.

Finally, essentially no part of said shell rim moulding surfaces extend above the upper surface of the mould element in the closed position.

Hereby is obtained that the individual core members can be lowered to different depths to make all articles in a given mould element complete, irrespective of variations in the volume or actual depth of the mould cavities or in the amount of deposited chocolate. This provides unforeseen flexibility of the moulding system, which is capable of compensating for variations that are far greater than those actually experienced. If one mould cavity in a mould element contains significantly more liquid chocolate than the others, the core member associated with this mould cavity will simply stop its vertical travel before the other core members and due to the independence of the suspension the continued vertical travel of the remaining core members will not be affected. If on the other hand, significantly less chocolate has been deposited into a mould cavity, the associated core will continue its vertical travel, independently of the other cores, to the point where this article is also complete. The same will apply in case of a significantly deeper or less deep mould cavity. The bottom part of the shells may vary slightly in thickness.

By thus having essentially no part of the shell rim moulding surfaces above the upper surface of the mould element, is obtained the advantage that the shells can be processed further for the manufacture of filled pralines. Thereby, it is possible to manufacture shells for pralines with a predetermined geometry, especially a predetermined geometry of the shell rim used for providing the joint between the bottom of the praline and the shell.

Furthermore, a first part of the shell rim moulding surfaces may extend below the upper surface of the mould element in the closed position. Thereby is obtained the advantage that this first surface can be used to provide a joint between the shell and the bottom plate when the latter is moulded.

According to an especially preferred embodiment, a second part of said shell rim moulding surfaces is essentially horizontal and flush with the upper surface of the mould element in the closed position. It is impossible to obtain 100% exact mould elements. Furthermore, elements are made from material that may change over time as they are used. By providing the shell rim moulding surfaces with an essentially horizontal part this part is used to compensate for inaccuracies in the positioning of the cores and associated cavity closure means in relation to the mould cavities.

Preferably, the second, essentially horizontal part of the shell rim moulding surfaces extends a length from 5 to 50% of the thickness of the wall of the article. Experience has shown that this length corresponds to the inaccuracies typically experienced.

Preferably, the first part of the shell rim moulding surfaces extending below the upper surface of the mould element is inclined to the upper surface of the mould element and extends in an essentially straight line. Furthermore, the first, inclined part of the shell rim moulding surfaces could form an angle of 0 to 90° with the upper surface of the mould element. It is an advantage to have a straight surface to provide the joint between the shell and the bottom of the praline. It is especially advantageous to have this surface inclined since the total area of the joint thereby is increased. Furthermore, when heating the shell rim prior to moulding the bottom of the praline only the part of the shell used for the joint is heated and the visible parts of the shell do not loose its temper. Thereby, undesired fat-bloom around the joint is avoided.

According to a further embodiment of the invention, the first, inclined part of the shell rim moulding surfaces extends a distance below the upper surface of the mould element in the closed position, said distance being up to 100% of the thickness of the shell. According to this embodiment it is possible to provide a good strong joint between the shell and the bottom of the praline.

One way of providing enhanced and secure guidance is to provide sliding surfaces that engage opposite sliding surfaces. The sliding surfaces may be provided on the core members, on the holding device or on a separate guidance means. The sliding surfaces may furthermore be provided with a lubricant to reduce the friction and/or to improve contact cooling.

The top part of the core members may advantageously project into the holding device. Thereby especially secure engagement to the holding device is obtained. By thus mounting the cores countersunk into the holding device a strong and compact system is obtained. Furthermore, it becomes possible to make the cavity closure means an integrated part of the holding device.

The vertical travel of the independently suspended core members in relation to the holding device may also be provided by a separate guidance. The means used to provide guidance may be laid out in many different ways. The guidance may thus be fixed to the core members or to the holding device and be moveable in relation to the other part. Furthermore, the guidance may be provided by having a top part of the core members adapted to provide independent suspension and guidance for the vertical travel of the core members.

The independent suspension of the cores may be laid out in different ways as either compressible or expandable means. Both types of means may be either metal or rubber spring means electromagnetic means, weight means, mechanical means, hydraulic means, or pneumatic means. These means ensure that the pressure exerted on each core member is the same and that their immersion into the chocolate mass stops at the point where the mould cavity is completely filled thereby preventing waste.

According to the invention, the system may also comprise a seal provided on the independently suspended core members to allow pressure build up between the top of the independently suspended core members and opposite surfaces of the holding device. This seal may alternatively be provided on the holding device instead. Thereby is obtained that it is possible to build up pressure between the cores and the holding device. This provides extremely uniform suspension of the core members.

According to a preferred embodiment of the invention, the system may comprise means adapted to push the independently suspended core members forward from the holding device and adapted to retract the independently suspended core members into the holding device. By this embodiment, the holding device is first lowered unto contact with the upper surface of the mould element. Then the cores are projected from the holding device into the chocolate mass. Lowering the cores in this way has been found to provide exceptionally good displacement of the chocolate in the mould, irrespective of the geometry of moulded articles. Even with large and complex figures, the chocolate is displaced uniformly to determine the complete geometry of the article. The trapped air will escape between mould and rimplate and/or rimplate and core member.

Finally, the system may comprise the arrangement of load means adapted to press the core members in direction against the cavity. Hereby unforeseen uniform appearance as well as homogeneous mass consistence is obtained. The density of the moulded mass material is furthermore much more uniform as by prior methods, whatever the part or geometry of the article may be. In other words, every article produced has an optimal quality and properties as desired. Consequently, the waste percentage is vanishing.

The invention will be explained more fully below with reference to particularly preferred embodiments as well as the drawings, in which.

Figure 1:
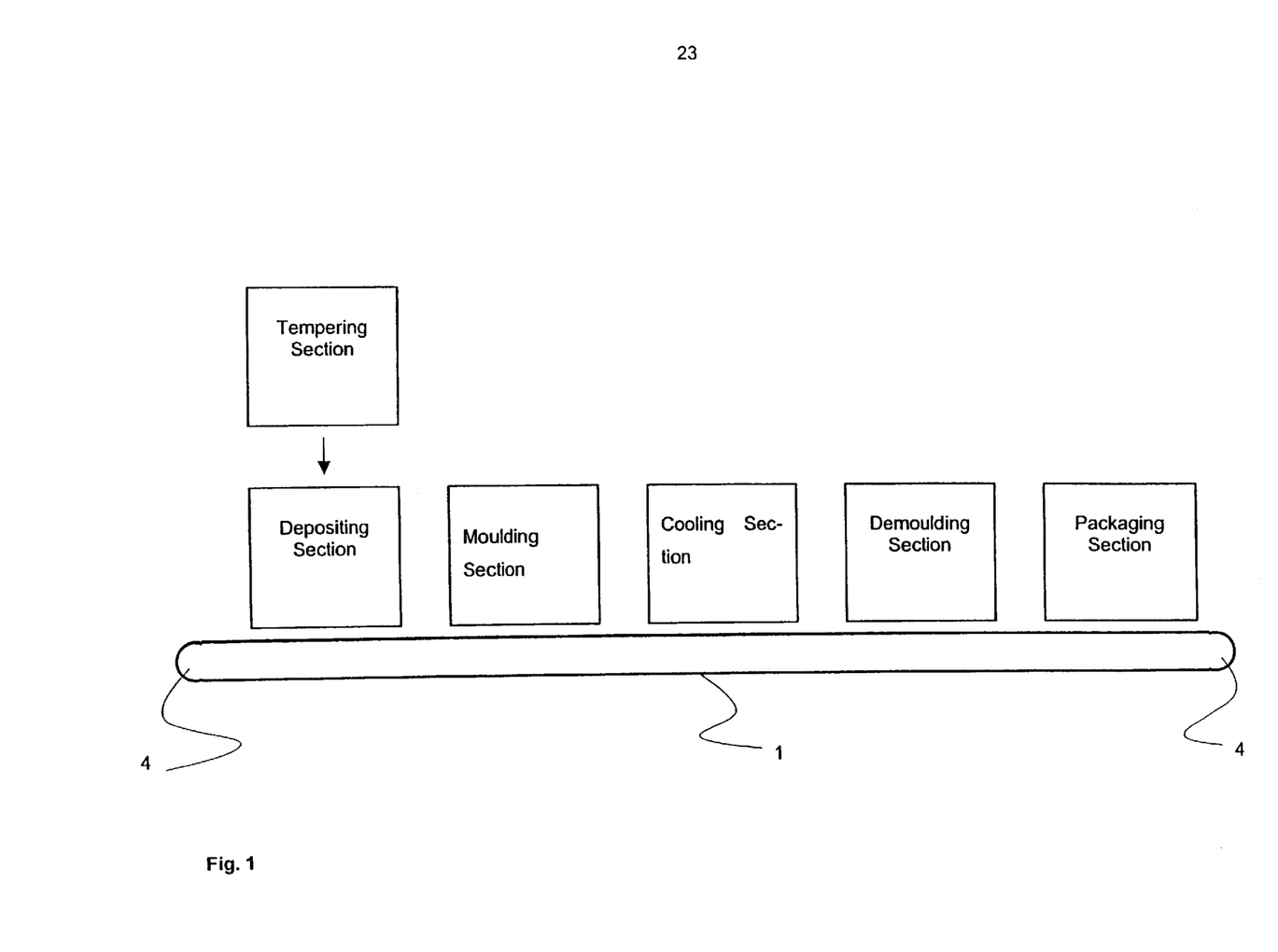
FIG. 1 is a schematic view of the steps performed to reach a packaged shell product.

Steps to be performed for reaching a packed shell product are schematically disclosed in FIG. 1.

Between two turning points 4 an endless carrier 1 normally carries mould elements 2 through the depositing section, the moulding section, the cooling section, the demoulding section and finally to the packaging section. Thereafter, the endless carrier belt 1 returns the mould elements 2 to the depositing section. The moulding elements 2 may comprise one or even several mould cavities 3, as depicted in FIGS. 2 and 3.

Figure 2:
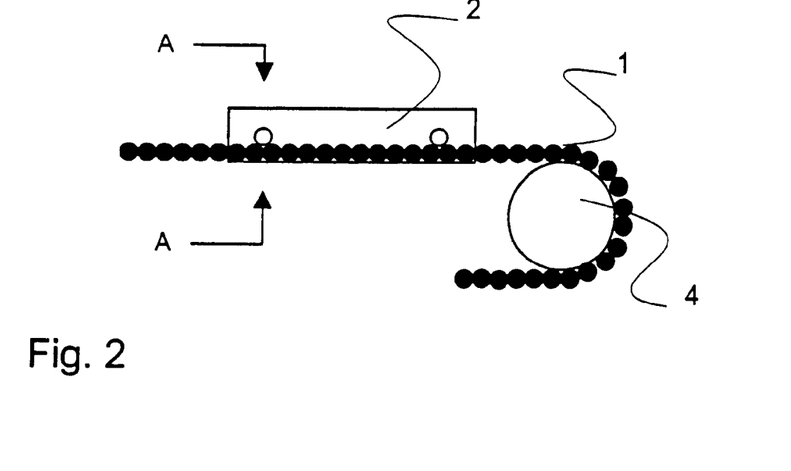
FIG. 2 is a schematic view of a turning point of an endless carrier for the mould elements, carried through the steps of FIG. 1.
Figure 3:
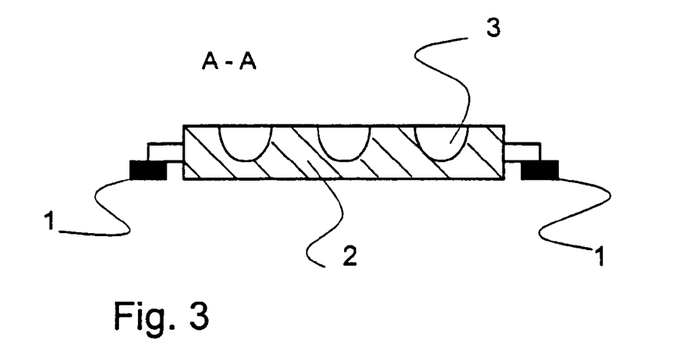
FIG. 3 is a sectional view along A—A of the mould element of FIG. 2.

Furthermore, it should be mentioned, that the FIGS. 1–3 disclose, that mould elements can be moved intermittent or continuously through the specific sections, such as the moulding or shell forming section. In the shell forming section, the moulding elements may be kept stationary when the associated core members are immersed, or the core members may be moved synchronously with the mould elements within the moulding section. Means for achieving such movements are well known to the skilled person within the art of chocolate making.

As described in EP 0 589 820 B1 (AASTED-MIKROVER APS) such systems comprise means for controlling the up and down movement of the core members as well as means for controlling the residence times of the core members in the fully immersed position, by the present invention especially to a predetermined time period. Furthermore, by the present invention, the residence times are typically lower than 60 seconds, though the invention is not restricted to such limitation. The residence times are more preferably lower than 20 seconds and are found to be especially expedient when between 0,1 and 5 seconds.

In the tempering section, the fat-containing, chocolate-like mass is normally tempered to a temperature of around 27–34° C. having a content of stable β crystals. However, the actual temperatures as well as contents of stable β crystals depend on the choice of the skilled person for the chocolate-like mass in question. The tempered chocolate-like mass is delivered to the depositing section, in which the liquid mass is deposited and shaken into the mould cavity 3. In the shell forming section to follow, a core member is immersed into the mass and the shell is actually formed. Thereafter, a cooling section may follow, as well as a section for demoulding the shell from the mould, and finally a packaging section, in which the shells are packed for delivery. The systems of the present invention are subject of the shell forming section.

It should be mentioned that in the remaining drawings of this description, it is disclosed that the tempered mass 5 already has been deposited and shaken into the mould cavities 3, 3', 3".

Means is arranged to control the temperature of the core members. This means could comprise well known temperature regulation devices such as a temperature measuring sensor connected via a wire to a control unit, which controls the regulation flow of a media, which circulates via channels into the holding device. However, these temperature regulation devices may be laid out in many different ways, such as comprising refrigeration or electrical heating, as long as they to the skilled person achieves an essentially constant temperature of the core member. The temperature of the core member could be controlled to be equal to or lower than 0° C., but could even be controlled to be higher than 0° C. An especially good quality of the shells as well as fast and efficient production has been achieved, when the temperature of the core member is controlled to be lower than around 10° C. typically in an controlled dry environment. Especially excellent results have been obtained, when the temperature of the core member is being controlled to be lower than −5° C.

Even the temperature of the mould cavity may be controlled, especially to between 10° C. and 30° C. Thereby it has astonishingly been discovered, that a smooth outer surface of the shells is obtained without having any shrinks air holes or depressions, such as the so called "Saturn" rings.

The mould cavities may be all closed by means of cavity closure means. This cavity closure means may be an integrated part of the holding device. This can be obtained by having the top part of the core members project into the holding device. Alternatively, the closure means may be an independent part of the system. Whatever the embodiment of the closure means, it has been found especially advantageous that the closure means are axially movable in relation to the core members. Thereby the core members can be lowered into the liquid mass after the closure means have been brought into contact with the upper surface of the cavity element. This ensures that the chocolate does not escape from the top of the mould cavities and that the mould element is not contaminated with chocolate.

By adjusting the loadforce of the spring means 9 the actual pressureforce obtained in the mass could be essentially the same every time when a new article is moulded. This could be done, for example by changing the numbers or actual size of a row of disc-springs or the like compressible spring means. The actual pressure force obtained in at the pressurised top surface of the core member is expected to be lower than $100 \times 10^5$ N/m$^2$.

Hereby is obtained that the individual core members can be lowered to different depths to make all articles in a given mould element complete, irrespective of variations in the actual depth of the mould cavities and the amount of deposited chocolate. This provides unforeseen flexibility of the moulding system, which is capable of compensating for variations that are far greater than the variations actually experienced. If one mould cavity in a mould element contains significantly more liquid chocolate than the others, the core member associated with this mould cavity will simply stop its vertical travel before the other core members and due to the independence of the suspension the continued vertical travel of the remaining core members will not be affected. If on the other hand, significantly less chocolate has been deposited into a particular mould, the associated core will continue its vertical travel, independently of the other cores, to the point where this article is also complete. The same will apply in case of a significantly deeper or less deep mould cavity. A consequence of the individual suspension of the core members is that the bottom part of the shells may vary slightly in thickness The system may comprise a separate guidance means 8, which could be in the embodiment of a slide guidance but could include other embodiments as well. The purpose of the guidance means 8 is to improve the precision of the vertical travel of the core members in relation to the holding device. The guidance means may be fixed to either the holding device or the core member. The guidance means could for instance be secured using a known type of threaded engagement means. Alternatively, the guidance means may be integrated into the holding device in the embodiments where the top part of the cores project into the holding device whereby the holding device provides the necessary guidance.

Especially excellent results have been obtained when the core members are lowered by a two step procedure. The holding device is lowered by a servo engine or other means to bring the cavity closure means into contact with the upper surface of the mould element 13. Thereafter the core members 6 are lowered by applying a pneumatic or hydraulic pressure through the channel to displace the chocolate and completely fill all the mould cavities 3 of the mould element 2. Experiments have shown that even in the case of significant over- or under-dosage of chocolate (up to +/−20%) all the shells 11 are complete and surplus chocolate is never pressed out of the tools to contaminate these or the mould elements.

When the shells 11 have been moulded, the cores 6 are lifted again by the pneumatic or hydraulic means. Important is that the cavity closure means is still in contact with the shell whereby the delicate rim of the article is protected as the adhesion forces are released by lifting the cores. Two effects are obtained by this embodiment. First, the articles are protected so that the percentage of broken articles is vanishing. Secondly, experiments have show surprisingly that the cores can actually be lifted slightly earlier than otherwise without damaging the articles. Thereby, increased production speed is achieved.

In order to reduce the friction between the moveable parts of the system, especially between the core members and the holding device or between the guidance and either the holding device or the core member it has been found advantageous to provide a lubricant 16 to the sliding surfaces. This lubricant could be in the form of a traditional lubricant, e.g. oil or fat. Surprisingly, it has been found that a heat conduction compound may provide the necessary lubrication. Important is that the lubricant has a temperature range that goes well beyond the working temperature of the tool members. Important is also that the lubricant does not get into contact with and contaminates the chocolate-like mass.

Figure 4:
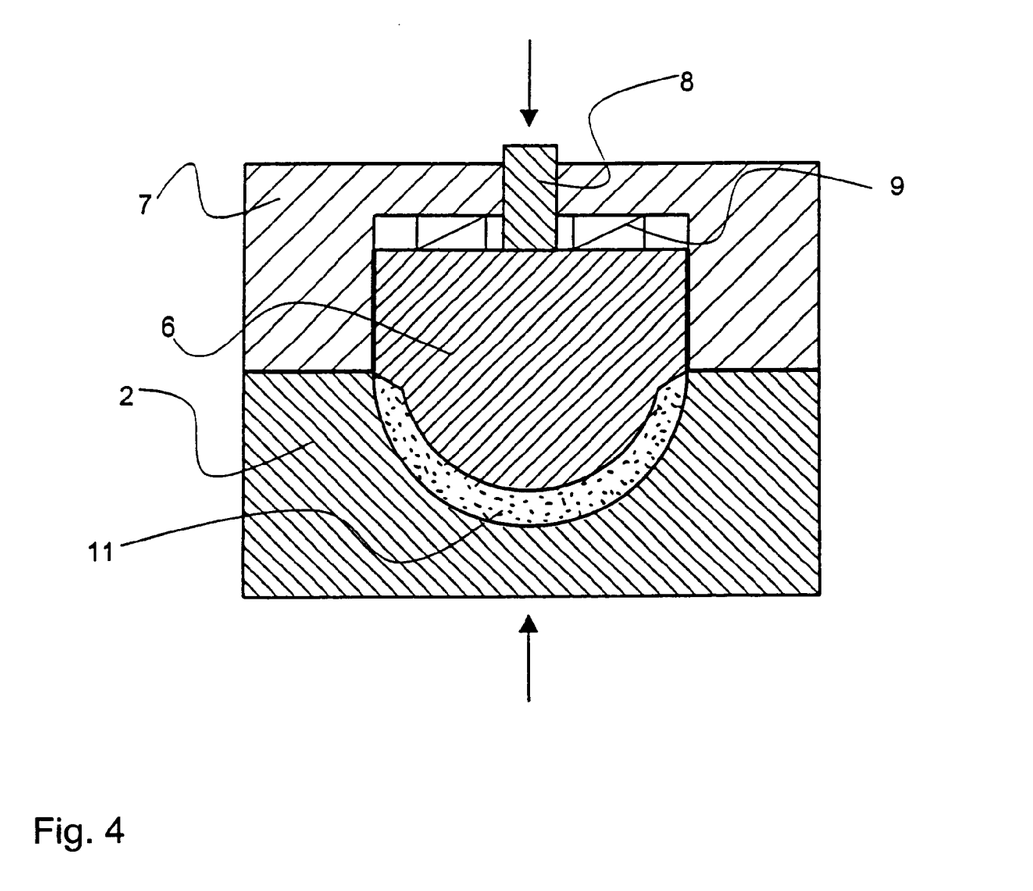
FIG. 4 is an embodiment shown as a lateral, schematic cross-sectional view through one of the core members and an associated underlying mould cavity filled with chocolate.

The principle of the invention is disclosed in FIG. 4, by which the rim of the shell 11 is formed by radially outwards extending surfaces of the core member.

Figure 5:
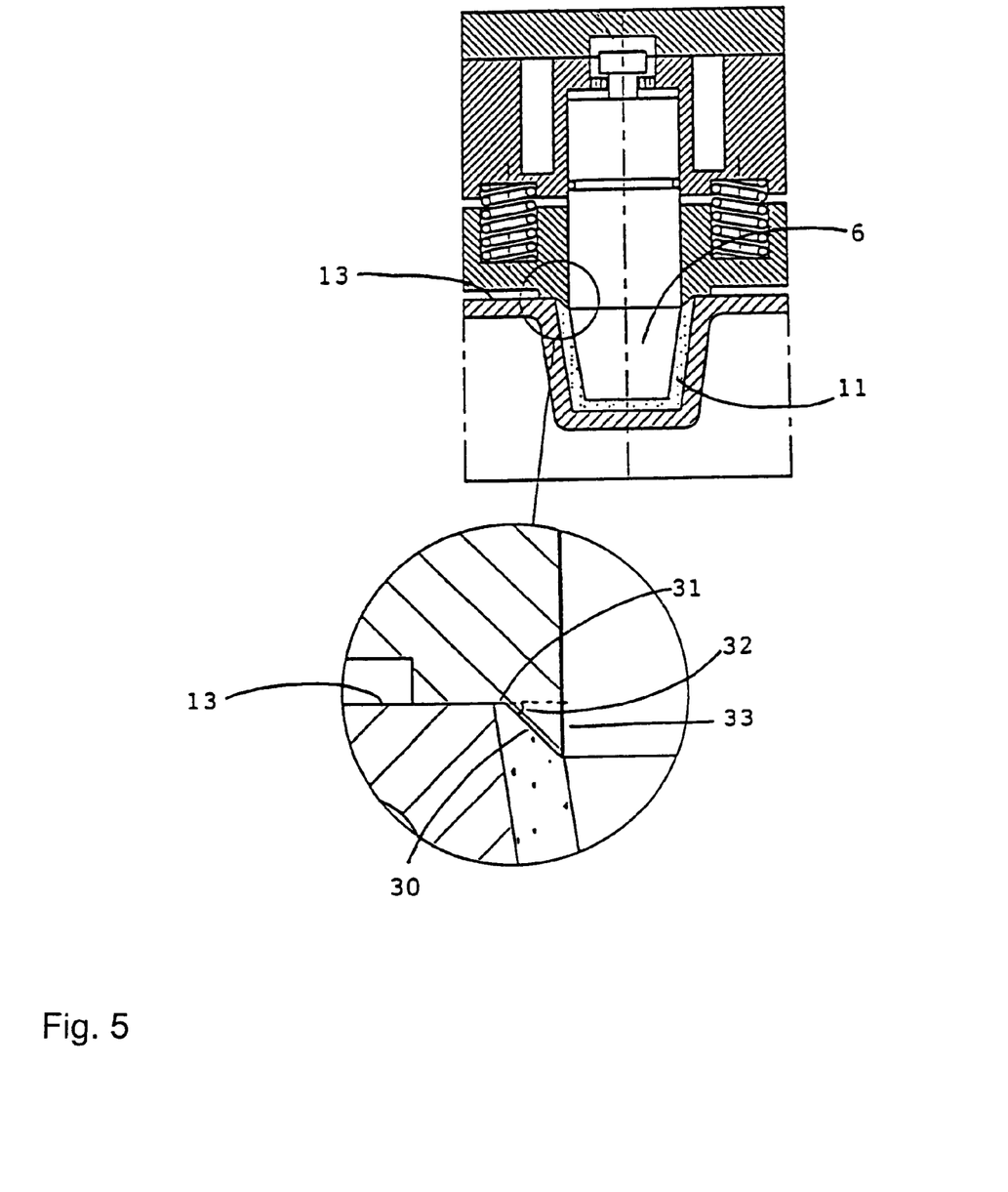
FIG. 5 is an embodiment where part of the shell rim moulding surfaces extend below the surface of the mould element in the closed position.

According to another embodiment, disclosed in FIG. 5, the moulding tool comprises a separate rim plate, which acts as a cavity closure means (34). As the plunger 6 is moved down towards the mould cavity 3, the separate closure means (34) will engage the upper surface (13) of the mould element. By further lowering the plunger into the mass, the latter is displaced to form the moulded shell. The special feature of this embodiment is that the rim of chocolate article is formed below the surface of the mould element. Thereby, the delicate rim is protected from physical damage during the later steps of the manufacturing process. The specific geometry of the rim may be varied within this embodiment of the invention to form the shape desired by the manufacturer.

When the shell has been moulded, the core 6 is lifted again. Important is that the cavity closure means (34) is still in contact with the shell whereby the delicate rim of the article is protected as the adhesion forces are released by lifting the cores (6). Two effects are obtained by this embodiment. First, the articles are protected so that the percentage of broken articles is vanishing. Secondly, experiments have show surprisingly that the cores (6) can actually be lifted slightly earlier than otherwise without damaging the articles. Thereby, increased production speed is achieved.

The shell produced according to the embodiment disclosed in FIG. 5 is especially well suited for the manufacture of filled pralines. Compared to the prior art, the article disclosed in FIG. 5 has a pre-determined geometry, especially a predetermined geometry of the shell rim used for providing a joint between the shell and the bottom of the praline.

Several advantages are obtained over the prior art. First, the interior volume of the shell, which is later to be occupied by the filling material, is more predictable than by the prior art. Furthermore, the total surface of the joint between the shell and the bottom of the praline may be increased if part of the moulding surface is inclined and extends a distance (33) below the upper surface (13) of the mould element thus increasing the strength of the joint. By having part (30) of the moulding surface inclined forming an angle (32) of 0 to 90° with the upper surface (18) of the mould element, and only a minor part (31) of the moulding surface horizontal, the joint becomes less visible on the praline. Finally, the temper of the moulded shell is not lost upon heating prior to moulding the bottom of the praline, since heating can be provided more exactly to the inclined surface than to the essentially vertical surface of a shell according to the prior art.

By this embodiment of the invention, it has been determined that it is possible to manufacture rapidly and in high quantities high quality filled pralines with a vanishing number of leaking pralines.

The temperature of the cavity closure means may also be controlled in the same way as the temperature of the plunger is controlled. As the plunger displaces the chocolate in the mould cavity and the chocolate is forced up against the cavity closure means (34). By controlling the temperature of the closure means it is ensured that the shell rim moulding surfaces (35) release the shell rim readily as said closure means are lifted from the mould element again.

As mentioned above, the core members are typically cooled by having a cooling medium flowing in channels (14) in the holding device (7). The cooling medium may be of any convenient type that is capable of removing heat from the holding device. The cooling medium may be circulated by suitable means and the velocity at which the medium is circulated may also be varied. From this it follows that it is possible to obtain turbulence in the cooling channels whereby the heat transfer from the holding device to the cooling medium may be greatly improved. Turbulence may be obtained by increasing the flow speed and/or by designing the channels in a way that promotes turbulence.

What is claimed is:

1. A system for the production of shells of fat-containing, chocolate-containing masses, comprising more than one mould cavity (3) in a mould element (2), to receive a mass (5), said mould element having an upper surface (13), more than one core member (6) to be immersed into the mass, the core members being independently suspended from a holding device (7), further comprising mould cavity closure means extending peripherally around the core members (6) and comprising shell rim moulding surfaces, which together with the outer surfaces of the cores and the inner surfaces of the mould cavities determine (15) the full geometry of ready moulded shells (11) in closed position, said cavity closure means being axially movable in relation to the core members, whereby essentially no pat of said shell rim moulding surfaces extends above the upper surface (13) of the mould element (2) in the closed position.

2. A system according to claim 1, whereby a first part (30) of the shell rim moulding surfaces extends below the upper surface (13) of the mould element (2) in the closed position.

3. A system according to claim 1, whereby a second part (31) of said shell rim moulding surfaces is essentially horizontal and flush with the upper surface (13) of the mould element (2) in the closed position.

4. A system according to claim 1, whereby said second part (31) of the shell rim moulding surfaces extends a length from 5 to 50% of the thickness of the wall of the article (11).

5. A system according to claim 2, whereby the first part (30) of the shell rim moulding surfaces extending below the upper surface (13) of the mould element (2) is inclined to the upper surface (13) of the mould element (2) and extends in an essentially straight line.

6. A system according to claim 5, whereby the first, inclined part (30) of the shell rim moulding surfaces forms an angle (32) of 0 to 90° with the upper surface (13) of the mould element (2).

7. A system according to claim 5, whereby the first, inclined part (30) of the shell rim moulding surfaces extends a distance (33) below the upper surface (13) of the mould element (2) in the closed position, said distance being up to 100% of the thickness of the shell (11).

* * * * *

UNITED STATES PATENT AND TRADEMARK OFFICE
CERTIFICATE OF CORRECTION

PATENT NO. : 6,508,642 B1  Page 1 of 1
APPLICATION NO. : 09/430816
DATED : January 21, 2003
INVENTOR(S) : Lars Austed It is certified that error appears in the above-identified patent and that said Letters Patent is hereby corrected as shown below:

Col. 2, line 7, "in" should be -- is --.

Delete the paragraphs beginning at Col. 5, line 5 and ending at Col. 6, line 3.

Col. 7, line 18, "an" should be -- a --.

Col. 8, line 34, "show" should be -- shown --.

Col. 9, line 8, "show" should be -- shown --.

Col. 10, line 25, "pat" should be -- part --.

Signed and Sealed this

Fifth Day of October, 2010

David J. Kappos
*Director of the United States Patent and Trademark Office*